United States Patent [19]
Wright et al.

[11] Patent Number: 5,204,816
[45] Date of Patent: Apr. 20, 1993

[54] THROTTLE ERROR DETECTION LOGIC

[75] Inventors: Keith Wright; Paul M. Fowler, both of Preston; Kwok W. Chan, Chorley, all of England

[73] Assignee: Eaton Corporation, Cleveland, Ohio

[21] Appl. No.: 668,832

[22] Filed: Mar. 13, 1991

[30] Foreign Application Priority Data

Mar. 29, 1990 [GB] United Kingdom ............... 9007012

[51] Int. Cl.⁵ ............................................. G06F 15/20
[52] U.S. Cl. ........................... 364/431.11; 364/424.03; 364/431.05; 123/479
[58] Field of Search ........................ 364/431.11, 431.03, 364/431.04, 431.07, 424.1, 424.03, 431.05, 132; 123/479, 339, 361, 399, 480; 74/866; 371/25.1

[56] References Cited

U.S. PATENT DOCUMENTS

| | | | |
|---|---|---|---|
| 4,319,658 | 3/1982 | Collonia et al. | 180/271 |
| 4,361,060 | 11/1982 | Smyth | 74/866 |
| 4,493,228 | 1/1985 | Vukuvich et al. | 74/858 |
| 4,541,052 | 9/1985 | McCulloch | 364/431.07 |
| 4,648,290 | 3/1987 | Dunkley et al. | 364/424.1 |
| 4,718,016 | 1/1988 | Sudo | 364/431.11 X |
| 4,779,597 | 10/1988 | Takaku et al. | 123/479 |
| 4,833,613 | 5/1989 | Mack et al. | 364/424.05 |
| 4,850,325 | 7/1989 | Abe et al. | 364/431.11 X |
| 4,920,939 | 5/1990 | Gale | 123/479 X |
| 4,922,425 | 5/1990 | Mack et al. | 364/424.1 |
| 4,965,730 | 10/1990 | Kurihara et al. | 364/424.1 X |
| 4,975,844 | 12/1990 | Holbrook et al. | 123/361 X |
| 4,989,147 | 1/1991 | Ishii | 364/424.1 |
| 5,012,414 | 4/1991 | Ishii et al. | 364/424.03 |
| 5,056,022 | 10/1991 | Witkowski et al. | 364/424.1 |

Primary Examiner—Parshotam S. Lall
Assistant Examiner—Thomas S. Auchterlonie
Attorney, Agent, or Firm—H. D. Gordon

[57] ABSTRACT

A fuel control system (100) for controlling the fueling of an internal combustion engine (E), and a fault detection system therefor, is provided. Signals (12, 17, 15, 16) indicative of the positioning of an operator controlled master unit (2) and of the slaved actuator (6,1) are compared to sense the existence of faults.

6 Claims, 1 Drawing Sheet

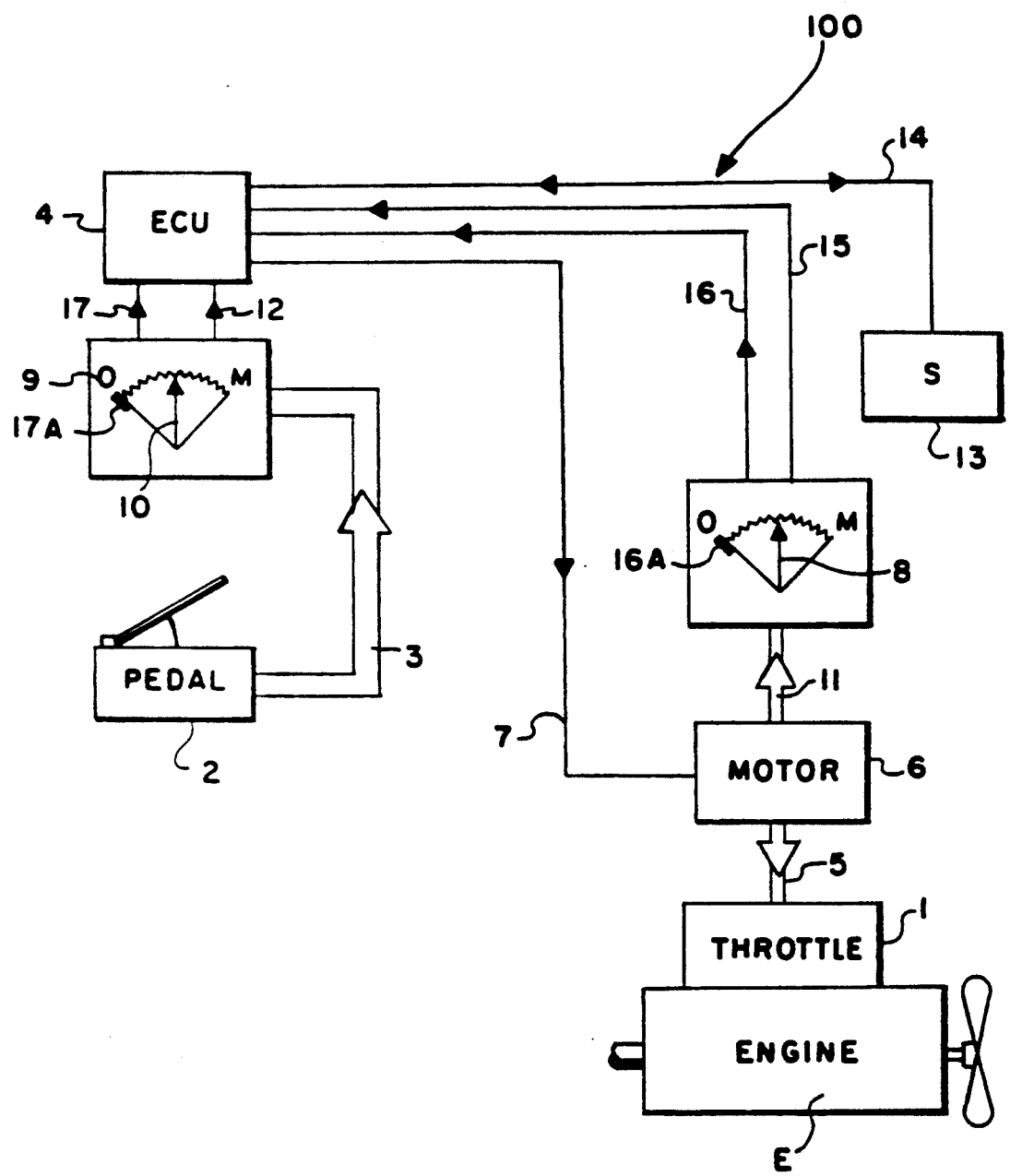

THROTTLE ERROR DETECTION LOGIC

BACKGROUND OF THE INVENTION

Related Applications

This application claims priority under 35 USC 119 from GB 9007012.9 filed Mar. 29, 1990 and assigned to EATON CORPORATION, the assignee of this application.

1. Field of the Invention

The present invention relates to vehicular throttle control systems for selectively controlling the supply of fuel to a vehicular internal combustion engine. In particular, the present invention relates to a throttle control system which normally fuels the vehicular engine in accordance with operator demands as indicated by the operator's positioning of the throttle/accelerator pedal but which, in certain modes, is operable to override the operator demands and supply fuel to the engine in a predetermined manner independent of the positioning of the throttle pedal. Such systems are typically associated with automatic/semi-automatic transmission systems having a certain degree of automation to the extent that driver control of the throttle or other fuel feed actuator is overridden by automatic means during gear ratio changes.

More particularly, the present invention relates to fuel control systems having a sender or master control operated by the vehicle operator, a control unit which is typically a microprocessor-based ECU, and a receiver unit which is controlled by the control unit and is effective to position the throttle device, and includes logic means for sensing faults in either the sender or receiver unit and for responding thereto.

It is understood that the term "throttle" and terms of similar import are intended to include various types of throttling devices, fuel injection pumps, fuel injection racks and similar devices which may be selectively controlled to provide variable amounts of fuel and fuel-/air mixtures to a controlled vehicular internal combustion engine.

2. Description of the Prior Art

Manual nonsynchronized vehicular change gear transmissions which rely on the vehicle operator having sufficient skill to accelerate or decelerate his engine in unison with his selected gear changes are, of course, well known in the prior art as may be seen by reference to U.S. Pat. Nos. 3,105,395; 4,754,665 and 4,735,109, the disclosures of which are hereby incorporated by reference. Synchronized transmissions and/or transmissions utilizing fluid fly wheels (i.e., torque converters) reduce the necessity of the vehicle operator properly controlling the speed of his engine during gear shifting but tend to be more costly, less fuel efficient and/or less robust than nonsynchronized mechanical transmissions. Automatic and semi-automatic mechanical transmission systems wherein gear shifts are at least partially automatically selected and/or implemented and wherein the fueling of the engine is automatically controlled during a transmission shift are also known in the prior art as may be seen by reference to U.S. Pat. Nos. 4,361,060; 4,648,290 and 4,722,248, the disclosures of which are hereby incorporated by reference.

Typically, the overriding throttle controller utilized in such automatic/semi-automatic transmission systems involves a control unit, typically a microprocessor based ECU, which receives input signals from various sensors including at least one sensor providing a signal indicative of the operator's positioning of a throttle pedal or the like and which sends command output signals to an actuator for adjusting the positioning of the fuel throttling device.

Upon completion of the automated or semi-automated shift operation, the control of the fuel throttling device is returned to the operator whereby the fuel throttling device will be directly controlled by the operator, or controlled by the ECU to directly track the requirements of the operator. Logic for the return of fueling control to the operator is known in the prior art and an example thereof may be seen by reference to U.S. Pat. No. 4,711,141, the disclosure of which is hereby incorporated by reference.

Logic for sensing faulty throttle position sensors and for fault tolerance logic associated therewith, is known in the prior art and examples thereof may be seen by reference to U.S. Pat. Nos. 4,833,614 and 4,922,425, the disclosures of both of which are hereby incorporated by reference.

In vehicular throttle control systems, especially throttle control systems having an override mode of operation, it is important to be able to sense faults in either the master control or sender device, the receiver or actuator device, and/or in a lack of conformity between the sender and the actuator.

SUMMARY OF THE INVENTION

According to the present invention, a throttle control system fault detection system/logic is provided for sensing various types of faults in a throttle control system, especially a throttle control system of the type comprising an operator control sender, a control unit and a throttle actuator motor/receiver. According to the invention, faults detected may take several forms; for instance a short circuit on the throttle actuator motor, disconformity between the sender potentiometer and the throttle actuator receiver potentiometer (including disconformities caused by mechanical locking or electrical connection faults); abnormal resistance values of each of these potentiometers (as sensed at the control unit ECU or otherwise) and, specifically, non-coincidence idle or zero position of the sender potentiometer and the throttle actuator receiver potentiometer.

Accordingly, it is an object of the present invention to provide a fault detection system/logic for sensing faults in a throttle controlled system comprising a sender controlled by the vehicle operator and providing a signal indicative of the operator's demand for fueling of a internal combustion engine, a control unit for receiving said signal and issuing command output signals to a throttle actuator receiver, and a throttle actuator receiver for controlling the amount of fuel supplied to the vehicular internal combustion engine, said actuator providing a feedback signal to the control unit indicative of the positioning of the throttle control member.

This, and other objects and advantages of the present invention will become apparent from a reading of the following description of the preferred embodiment taken in connection with the attached drawings.

BRIEF DESCRIPTION OF THE DRAWING

The drawing is a schematic illustration of a vehicular throttle control system showing the various electrical and/or mechanical connections necessary to implement the throttle control system fault detection system/method of the present invention.

DESCRIPTION OF THE PREFERRED EMBODIMENT

Referring to the FIGURE, there is shown symbolically a fuel control system 100 for controlling the amount of fuel supplied to a vehicular internal combustion engine E by controlling the positioning or setting of a throttle member 1. As mentioned above, throttle member 1 may be any one of many known devices for controlling the amount of fuel supplied to an internal combustion engine such as the throttle valve, the fuel injection pump, a fuel injection rack or the like. Throttle control systems of the type illustrated are typically utilized with vehicular transmission systems wherein shift selection and/or shift implementation is at least partially automated. Vehicular transmission systems of this type are known in the prior art as may be seen by reference to the above-mentioned U.S. Pat. Nos. 4,361,060; 4,648,290 and 4,722,248. Fuel control systems for automated/semi-automated transmission systems, including so-called "fly-by-wire" transmission systems are known in the prior art as may be seen by reference to U.S. Pat. Nos. 4,493,228; 4,319,658; 4,226,141; 4,531,430; 4,473,049; 4,474,083; and 4,455,978, the disclosures of all of which are hereby incorporated by reference.

Referring more specifically to the drawing, the fuel throttling device 1 for controlling the amount of fuel supplied to a vehicular internal combustion engine E is controlled under normal operating conditions by the usual driver operated throttle or accelerator pedal 2 through a mechanical connection 3 to a potentiometer 9, an electrical control unit typically a microprocessor based ECU 4 responsive to the slider 10 position of potentiometer 9 by the electrical output on a electrical connection 12, and a slave motor 6 which actuates the fuel control device 1 in accordance with the electrical command output 7 of the ECU 4.

The system illustrated in the Figure is of the type referred to as a "fly-by-wire" throttle control system and the potentiometer 9 is often referred to as the "master" or "sender" potentiometer while the motor 6, which may be a stepper motor or the like, is often referred to as the "slave" or "receiver" actuator motor.

The "normal operating condition" for operation of the throttle device 1 is herein defined as that occurring when neither a gearshift is in progress nor has any of certain faults, described hereinafter, been detected.

Normally, the electrical output on electrical connection 7 from ECU controller 4 to the actuator motor 6, i.e., the command output signal to stepper motor 6, is a result of a direct comparison between the voltage output of a slave potentiometer slider 8 driven by motor 6 by means of a shaft 11 in exact correspondence with the motor drive of the throttle actuator 1. That is, rotation of shaft 5 by motor 6 should result in a corresponding rotation of shaft 11 and movement of slider 8 of the slave potentiometer. Therefore, the slider output or feedback 15 reflects the current throttle position, and is normally compared to the master potentiometer output 12 by ECU 4 to servo the throttle control 1 in accordance with the manual control 2.

When a gearshift is in progress of the vehicular transmission only the shift unit 13 of which is shown, the normal operating mode for setting the position of throttling control device 1 is overridden as indicated below.

The ECU 4 also controls the shifters 13 for the vehicular transmission according to command output signal along line 14 which may convey back verifications to the ECU of the state of the gear box and the state of the shifter transducers in the shifter 13 after an attempted shift.

Electronically controlled transmission shifters are well known in the prior art as may be seen by reference to U.S. Pat. Nos. 4,873,881; 4,899,607; and 4,928,544, the disclosures of all of which are hereby incorporated by reference. We are not, herein, concerned with how the gear synchronization is conducted, except that the output 12 of the master potentiometer is ignored by the ECU 4 and the ECU 4 command output signals on line 7 are selected according to synchronization logic to accomplish the required upshift or downshift of the transmission. During a gear shifting operation the slave motor 6 positions the fuel control throttle 1 and the potentiometer slider 8 according to the command output signal 7. As before, the position of the slider of the slave potentiometer is conveyed over line 15 to the ECU 4 for verification that the throttle is being positioned as commanded by the ECU. If the automatic throttle control (i.e., "dipping" or "blipping" the throttle) does not work properly, synchronization may not be achievable and engagement of the selected gear ratio may not be accomplishable or damage may be done to the transmission, either of which must be manifest as quickly as possible over channel 14. Once synchronization is achieved, the master poteniometer 9 is used again by the ECU to determine the throttle opening, i.e., normal throttle control is established, and the driver selects it by pedal 2. Return of the control of the throttle 1 to the operator may be accomplished by various prior art methods, an example of which may be seen by reference to above-mentioned U.S. Pat. No. 4,711,141.

If one of several fuel control system faults is detected, normal operation of the throttle control is also overridden as indicated below.

A first type of fault detectable by the fault detection system/logic of the present invention are faults of overstiffness or sticking of various mechanical members associated with the throttle control device 1 and/or shorting at, or in, the slave actuator motor 6 which can be sensed over channel 7 or otherwise by excessive motor current drawn. The ECU 4 is provided with logic which will, upon sensing such a fault, be effective to cause the motor to be turned off, i.e., to break the supply of current to the motor, whereupon a return bias spring (not shown) either zeroes the motor, or reduces it so much that the fuel control throttle is almost at idle under driver control 2. The driver will be prevented by the ECU from changing gear but he can limp his vehicle at his convenience to rest. If the motor and throttle are completely zeroed, limping may not be possible. Only at rest can he attempt to reset the ECU emergency action, which is latching, and to reset the warning or error code indication if the fact the detected fault can be eliminated.

The second type of fault detectable by the fault detection system/logic of the present invention, assuming motor 6 fidelity, involves checking the outputs of the two potentiometers, master potentiometer 9 and slave potentiometer 6. The two potentiometers are checked in unison for correspondence in position and checked individually for "reasonableness". If one or both sliders are at fault, that is signaled. Potentiometer 6 and 9 are compared periodically over leads 12 and 15, certainly after completion of each gear change. If the comparison shows a substantial noncorrespondence, e.g., a mismatch of at least 0.4 v over 0.5 seconds, further gears changes are again inhibited by the ECU, the throttle is returned to zero or idle, and warnings are announced until the vehicle is brought to rest, the fault condition has been corrected, and a manual reset of the ECU has been made.

Additionally, the voltages over leads 12 and 15 are individually monitored, and if either falls above or below a set voltage range, a fault with the wiring or hardware is assumed and the ECU sets up its warning and inhibits routine as before until a vehicle stop has been made, the fault condition has been corrected and the ECU has been reset.

A third type of fault detectable by the fault detection system/logic of the present invention which can be critical during normal driving is the fault of actuator potentiometer slider 8 not slaving to idle in spite of being so commanded by the ECU because the master potentiometer 9 is at idle. This could cause overrotation of the engine, nonsynchronization, burn out of the engine or transmission brakes, or very slow, unreliable gear shifts. Accordingly, the potentiometers each operate an on/off switch, 16A and 17A, in opposite senses at, or very near, the zero position zero of their slider 8 and 10 and the conditions of the switches are signaled over lines 16 and 17 to the ECU 4.

Preferably, the switch associated with sender potentiometer 9 is open circuit at idle and that of the slave throttle actuator potentiometer slider 8 is closed circuit at the idle setting. Thus, if ever the two switches remain both open or both closed for more than a predetermined period of time, such as two seconds, the ECU 4 will again establish the above inhibiting or a similar error routine.

Of course, the oppositely polled two way switches utilized to indicate the idle or non-idle conditions may be located at the pedal 2, the stepper motor 6, or on the throttle 1.

Microprocessor based ECU controllers, such as controller 4, having logic for fault sensing subroutines, and for signalling faults, are known in the prior art as may be seen by reference to U.S. Pat. Nos. 4,595,986 and 4,888,577, the disclosures of which are incorporated by reference.

Accordingly, the present invention provides a fault detection system/logic whereby various sources of unreliability in an ECU controlled throttle, injector, or other fuel feed actuator are detected and appropriate action is taken in response thereto.

Although the present invention has been described in reference to a specific embodiment, it is to be recognized that this invention is not limited thereto, and that various modifications may be made without departing from the actual scope and spirit of the invention.

I claim:

1. An error detecting fuel control system for controlling the supply of fuel to an internal combustion engine, said system comprising:
    a master control unit (2, 3, 9, 10) for operation by an operator and for supplying a first signal (2) indicative of the operator's request for fueling of the engine;
    a slaved actuator unit (6, 5, 1, 11, 8) for supplying fuel to the engine in accordance with a command signal (7) and providing a second signal (15) indicative of the current supply of fuel to the engine; and
    a control unit (4) for receiving at least said first and second signals and for processing same in accordance with predetermined logic rules to issue said command signal, said control unit having at least one mode of operation ("normal") wherein said command signals are intended to cause said slaved actuation unit to supply an amount of fuel to said engine which is a function of said first signal;
    a first two-position switch (17A) associated with said master control and assuming one of said first and second positions (on/off, open/closed, 0/1) when said master control is in a position corresponding to the operator's desire for minimum ("idle") fueling of said engine and assuming said other of said first and second positions thereof when said master control is not in the position corresponding to the operator's desire for minimum fueling of said engine, said first switch providing a third signal (17) indicative of the current position thereof; and
    a second two-position switch (16A) associated with said slaved actuation unit and assuming said one of said first and second positions (on/off, open/closed, 0/1) when said slaved actuation unit is not in a position corresponding to desire for minimum ("idle") fueling of said engine and assuming said other of said first and second positions thereof when said slaved actuation unit is in the position corresponding to minimum fueling of said engine, said second switch providing a fourth signal (16) indicative of the current position thereof.

2. The system of claim 1 further characterized by means effective to cause said control unit to issue command signals causing said slaved actuator to assume said minimum ("idle") fueling condition if, for a predetermined period of time, said third and fourth signals indicate that said first and second switches are both in said first positions or are both in said second positions thereof.

3. The system of claim 1 further characterized by means effective to cause said control unit to issue command signals causing said slaved actuator to assume and to maintain said minimum ("idle") fueling condition if, for a predetermined period of time, said third and fourth signals indicate that said first and second switches are both in said first positions or are both in said second positions thereof.

4. An error detecting fuel control system for controlling the supply of fuel to an internal combustion engine associated with an at least partially automated transmission system, said system comprising
    a master control unit (2, 3, 9, 10) for operation by an operator and for supplying a first signal (12) indicative of the operator's request for fueling of the engine;
    a slaved actuator unit (6, 5, 1, 11, 8) for supplying fuel to the engine in accordance with a fuel command signal (7) and providing a second signal (15) indicative of the current supply of fuel to the engine;
    a transmission shifter (13) for shifting a change gear transmission in accordance with a shift command signal (14) and providing a third signal (14) indicative of current shifter position; and
    a control unit (4) for receiving at least said first, second and third signals and for processing same in accordance with predetermined logic rules to issue said fuel and shift command signals, said control unit having at least one mode of operation ("normal") wherein said fuel command signals are intended to cause said slaved actuation unit to supply an amount of fuel to said engine which is a function of said first signal, and at least one other mode of operation wherein said fuel command signals are intended to cause said slaved actuator to supply an amount to said engine which is independent of said first signal;

a first two-position switch (17A) associated with said master control and assuming one of said first and second positions (on/off, open/closed, 0/1) when said master control is in a position corresponding to the operator's desire for minimum ("idle") fueling of said engine and assuming said other of said first and second positions thereof when said master control is not in the position corresponding to the operator's desire for minimum fueling of said engine, said first switch providing a third signal (17) indicative of the current position thereof;

a second two-position switch (16A) associated with said slaved actuation unit and assuming said one of said first and second positions (on/off, open/closed, 0/1) when said slaved actuation unit is not in a position corresponding to desire for minimum ("idle") fueling of said engine and assuming said other of said first and second positions thereof when said slaved actuation unit is in the position corresponding to minimum fueling of said engine, said second switch providing a fourth signal (16) indicative of the current position thereof; and means effective to cause said control unit to issue command signals causing said slaved actuator to assume said minimum ("idle") fueling condition and said shifter to retain the transmission in the currently engaged ratio if said third and fourth signals indicate that said first and second switches are both in said first positions or are both in said second positions thereof for at least a predetermined period of time.

5. A fault detection method for a fuel control system for controlling the supply of fuel to an internal combustion engine, said system comprising;

a master control unit (2, 3, 9, 10) for operation by an operator and for supplying a fist signal (12) indicative of the operator's request for fueling of the engine;

a slaved actuator unit (6, 5, 1, 11, 8) for supplying fuel to the engine in accordance with a command signal (7) and providing a second signal (15) indicative of the current supply of the fuel to the engine; and a control unit (4) for receiving at least said first and second signals and for processing same in accordance with predetermined logic rules to issue said command signal, said control unit having at least one mode of operation ("normal") wherein said command signals are intended to cause said slave actuation unit to supply an amount of fuel to said engine which is a function of said first signal, said method comprising the steps of:

providing a first two-position switch (17A) associated with said master control and assuming one of said first and second positions (on/off, open/closed, 0/1) when said master control is in a position corresponding to the operator's desire for minimum ("idle") fueling of said engine and assuming said other of said first and second positions thereof when said master control is not in the position corresponding to the operator's desire for minimum fueling of said engine, said first switch providing a third signal (17) indicative of the current position thereof;

providing a second two-position switch (16A) associated with said slaved actuation unit and assuming said one of said first and second positions (on/off, open/closed, 0/1) when said slaved actuation unit is not in a position corresponding to desire for minimum ("idle") fueling of said engine and assuming said other of said first and second positions thereof when said slaved actuation unit is in the position corresponding to minimum fueling of said engine, said second switch providing a fourth signal (16) indicative of the current position thereof; and causing said control unit to issue command signals causing said slaved actuator to assume and maintain said minimum ("idle") fueling condition if, for a predetermined period of time, said third and fourth signals indicate that said first and second switches are both in said first positions or are both in said second positions thereof.

6. A fault detection method for a fuel control system for controlling the supply of fuel to an internal combustion engine associated with an at least partially automated transmission system, said system comprising;

a master control unit (2, 3, 9, 10) for operation by an operator and for supplying a first signal (12) indicative of the operator's request for fueling of the engine;

a slaved actuator unit (6, 5, 1, 11, 8) for supplying fuel to the engine in accordance with a fuel command signal (7) and providing a second signal (15) indicative of the current supply of fuel to the engine;

a transmission shifter (13) for shifting a change gear transmission in accordance with a shift command signal (14) and providing a third signal (14) indicative of current shifter position; and a control unit (4) for receiving at least said first, second and third signals and for processing same in accordance with predetermined logic rules to issue said fuel and shift command signals, said control unit having at least one mode of operation ("normal") wherein said fuel command signals are intended to cause said slaved actuation unit to supply an amount of fuel to said engine which is a function of said first signal, at least one other mode of operation wherein said fuel command signals are intended to cause said slaved actuator to supply an amount to said engine which is independent of said first signal;

said method comprising the steps of:

providing a first two-position switch (17A) associated with said master control and assuming one of said first and second positions (on/off, open/closed, 0/1) when said master control is in a position corresponding to the operator's desire for minimum ("idle") fueling of said engine and assuming said other of said first and second positions thereof when said master control is not in the position corresponding to the operator's desire for minimum fueling of said engine, said first switch providing a third signal (17) indicative of the current position thereof, providing a second two-position switch (16A) associated with said slaved actuation unit and assuming said one of said first and second positions (on/off, open/closed, 0/1) when said slaved actuation unit is in a position corresponding to the operator's desire for minimum ("idle") fueling of said engine and assuming said other of said first and second positions thereof when said slaved actuation unit is not in the position corresponding to minimum fueling of said engine, said second switch providing a fourth signal (16) indicative of the current position thereof; and causing said control unit to issue command signals causing said slaved actuator to assume said minimum ("idle") fueling condition and said shifter to retain the transmission in the currently engaged ratio of third and fourth signals indicate that said first and second switches are both in said first positions or are both in said second positions thereof for at least a predetermined period of time.

* * * * *